Nov. 20, 1956     A. WERFELI     2,771,006
HIGHLY CORRECTED PHOTOGRAPHIC OBJECTIVES COMPRISING
FOUR AXIALLY AIR SPACED COMPONENTS
Filed April 12, 1955

INVENTOR
ARNOLD WERFELI
By Emory L. Groff
Attorney

United States Patent Office 2,771,006
Patented Nov. 20, 1956

2,771,006

HIGHLY CORRECTED PHOTOGRAPHIC OBJECTIVES COMPRISING FOUR AXIALLY AIR SPACED COMPONENTS

Arnold Werfeli, Yverdon, Switzerland, assignor to Paillard S. A., Sainte-Croix, Switzerland, a corporation of Switzerland Application April 12, 1955, Serial No. 500,937

Claims priority, application Switzerland May 5, 1954

3 Claims. (Cl. 88—57)

The present invention relates to a photographic objective of high luminosity, corrected from aberration of sphericity, coma, astigmatism, distortion, curvature of field and chromatic aberrations, comprising four components separated by air spaces, the first and the fourth of the said components being simple convergent lenses, the second and the third being groups each formed by two cemented lenses of which one is divergent, each of the groups constituting a divergent meniscus.

Objectives of this character are known, but have the disadvantage of having for a relatively large opening a very considerable zonal aberration of sphericity.

The invention has for its object to eliminate the said inconvenience and has for its subject an objective in which the aberration of sphericity is remarkably well corrected, so that, for a relative opening of at least $f\div 1.3$, the zonal aberration of sphericity does not exceed 0.1% of the focal length.

The objective according to the invention is distinguished from known objectives in that the radius of cementing of the lenses of the groups located at the side of the object is, in absolute value, greater than twelve times the focal length of the objective, the radius of cementing of the lenses of the group located on the side of the film having an absolute value comprised between 55% and 75% of the said focal length, the refractive index of the glass of the divergent lens of said second group being greater than the refractive index of the convergent lens of the same group, said latter refractive index being at least equal to the refractive index of the lens of the said fourth component, of which the value is greater than 1.70, the arithmetical average of the refractive indices of said latter lens and of the lenses of the said second group being at least 1.72, the thickness of the convergent lens of the first group being at least 18% of the focal length of the objective.

The accompanying drawings show diagrammatically and by way of example, an objective according to the invention and some of its characteristics:

Figure 1:
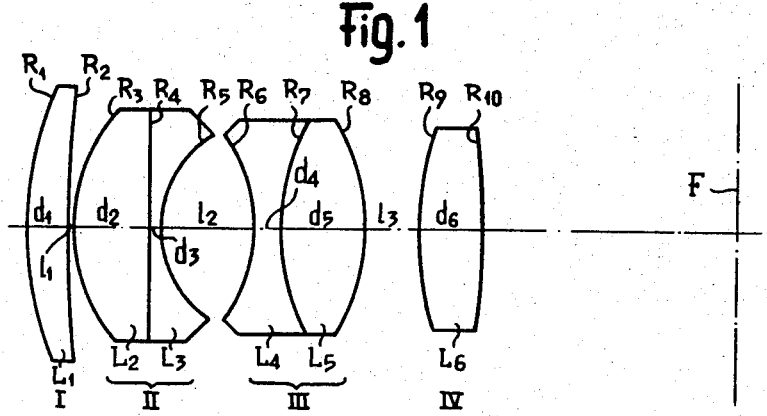
Fig. 1 shows the objective.

As will be seen in Fig. 1, the objective is formed by four components I, II, III and IV separated by the air spaces $l_1$, $l_2$ and $l_3$. The first I and the last IV of the four components, starting from the object towards the plane of the film F (from the left to the right in Fig. 1), are each formed by a simple convergent lens $L_1$ and $L_6$. On the contrary, the two other components II and III, located on opposite sides of the diagram (not shown), are groups each formed by two lens $L_2$ and $L_3$, and $L_4$ and $L_5$ respectively, cemented together. The lenses $L_2$ and $L_5$ are convergent, the lenses $L_3$ and $L_4$ being divergent. It will be seen that each of the two groups constitute a divergent meniscus.

The following table gives the numerical values of an objective according to the invention for a total focal length $f=100$ mm. and a relative opening $f\div 1.3$. The radii of curvature of the surfaces of the lenses are indicated by R, their thicknesses by $d$, whilst $n_D$ and V respectively indicate the refractive index by the ray D of the spectrum and the Abbe number of the glass used.

|   | L | R in mm. | d. l in mm. | $n_D$ | V |
|---|---|---|---|---|---|
| I | $L_1$ | $R_1=+\ 93.32$ | $d_1=11.32$ | $n_1=1.7169$ | $V_1=47.8$ |
|   |   | $R_2=+358.32$ | $l_1=\ 0.4$ |   |   |
| II | $L_2$ | $R_3=+\ 46.32$ | $d_2=20$ | $n_2=1.6444$ | $V_2=47.9$ |
|   | $L_3$ | $R_4=\infty$ | $d_3=\ 2$ | $n_3=1.5892$ | $V_3=41$ |
|   |   |   | $l_2=24$ |   |   |
|   |   | $R_5=+\ 28.68$ | $l_2=24$ |   |   |
|   |   | $R_6=-\ 41.32$ |   |   |   |
| III | $L_4$ | $R_7=+\ 60.8$ | $d_4=\ 6$ | $n_4=1.7618$ | $V_4=26.5$ |
|   | $L_5$ | $R_8=-\ 55$ | $d_5=22$ | $n_5=1.7449$ | $V_5=44.7$ |
|   |   |   | $l_3=13$ |   |   |
| IV | $L_6$ | $R_9=+\ 90.2$ | $d_6=16$ | $n_6=1.7169$ | $V_6=47.8$ |
|   |   | $R_{10}=-212.6$ |   |   |   |

As will be seen from the above table, the conditions set by the features of the invention are satisfied, that is to say:

$$R_4 > 12f$$

$$0.55f < R_7 < 0.75f$$

$$n_4 > n_5 \geqq n_6 > 1.70$$

$$\frac{n_4+n_5+n_6}{3} \geqq 1.72$$

$$d_2 \geqq 0.18f$$

On the other hand the above objective has the following features:

$$-R_{10} > 2R_9$$

$$-R_6 > 1.4R_5$$

$$l_2 > 0.22f$$

$$n_4 - n_3 > 0.12$$

$$\frac{n_1+n_2+n_3+n_4+n_5+n_6}{6} \geqq 1.68$$

Figure 2:
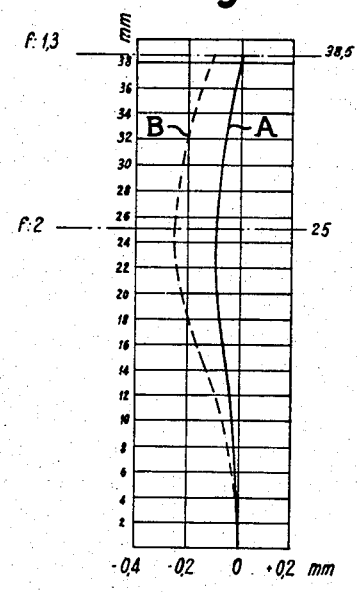
Fig. 2 shows the curves of aberration of sphericity and of the sine condition.

In Fig. 2 the curves A and B represent the aberration of sphericity and the sine condition respectively. It will be seen that for a relative opening of the objective of $f\div 1.3$, the zonal aberration of sphericity does not exceed 0.1% of the focal distance.

I claim:

1. A photographic objective of high luminosity corrected for spherical and chromatic aberrations, coma, astigmatism, distortion, and field curvature, comprising, in combination, four components in axial alignment, each of said components being separated from its adjacent component by an air space, the first of said components and the fourth of said components being simple convergent lenses and the second and third components being compound divergent meniscus components, each of said second and third components comprising a divergent lens cemented to a convergent lens, the thickness of the convergent lens of said second component having a value of at least 18% of the focal length of the objective, the radius of curvature of the cemented surface of the said second component having an absolute value greater than twelve times the focal length of the objective, the radius of curvature of the cemented surface of the third component having an absolute value between 55% and 75% of the focal length of the objective, the index of refraction of the divergent lens of the said third component being greater than the index of refraction of the convergent lens of said third component, the index of refraction of said convergent lens of said third component being at least equal to the index of refraction of the said fourth component, the index of refraction of said fourth component having a value greater than 1.70, the arithmetical average of the indices of refraction of said fourth component and of the divergent lens and convergent lens of said third component having a value of at least 1.72, whereby the spherical aberration is remarkably well corrected and does not exceed 0.1% of the focal length for a relative aperture of the objective having an equivalent focal length of at least 1.3.

2. A photographic objective of high luminosity corrected for spherical and chromatic aberrations, coma, astigmatism, distortion, and field curvature, comprising, in combination, four lens components in axial alignment, each of said components being separated from its adjacent component by an air space, each lens in said objective having a first radius and a second radius of curvature, the first component being near the object and the fourth component being near the plane of the film, the first of said components and the fourth of said components being simple convergent lenses and the second and third components being compound divergent meniscus components, each of said second and third components comprising a divergent lens cemented to a convergent lens, the first radius of curvature of the lens constituting the first component having an absolute value at least 90% of the value of the total focal length of the objective, the second radius of curvature of the lens constituting the first component having an absolute value at least 3.5 times the value of the total focal length of the objective, the first radius of curvature of the convergent lens of said second component having an absolute value at least 0.4 times the value of the total focal length of the objective, the thickness of said convergent lens of said second component having a value of at least 18% of the focal length of the objective, the radius of curvature of the cemented surface of said second component having an absolute value greater than twelve times the focal length of the objective, the second radius of curvature of said convergent lens of said second component and the first radius of curvature of the divergent lens of said second component being equal to each other and to the radius of curvature of said cemented surface of said component, said latter three radii coinciding with each other, the second radius of curvature of said divergent lens of said second component having an absolute value at least 0.25 times the focal length of the objective, the second component being separated from the third component by an air space greater than 0.22 times the focal length of the objective, the convergent lens of said second component being opposite the divergent lens of the third component, the first radius of curvature of the divergent lens of said third component having an absolute value greater than 1.4 times the second radius of curvature of the divergent lens of the second component, the radius of curvature of the cemented surface of said second component having an absolute value between 55% and 75% of the focal length of the objective, the said radius of curvature of said cemented surface coinciding with the second radius of curvature of said divergent lens of said third component and the first radius of the convergent lens of said third component, the second radius of curvature of said convergent lens of said third component having an absolute value of at least 0.50 times the focal length of the objective, the third component being separated from the fourth component by an air space having a value between 0 and 0.15 times the focal length of the objective, the first component being separated from the second component by an air space having a value between 0 and 0.01 times the focal length of the objective, the first radius of curvature of the fourth component having an absolute value less than the focal length of the objective, the second radius of curvature of the said fourth component having an absolute value at least two times the absolute value of said first radius of said fourth component, the index of refraction of the divergent lens of the third component being greater than the index of refraction of the convergent lens of said third component, the index of refraction of said convergent lens of said third component being at least equal to the index of refraction of said fourth component, the index of refraction of said fourth component having a value greater than 1.70, the arithmetical average of the indices of refraction of said fourth component and of the divergent and convergent lenses of said third component having a value of at least 1.72, the index of refraction of the divergent lens of said third component being at least 0.12 greater than the index of refraction of the divergent lens of the second component, the arithmetical average of the indices of refraction of the six lenses of said four components having a value of at least 1.68, the first component and the fourth component having Abbe numbers greater than 40 and less than 55, the convergent lenses of the second and third components having Abbe numbers greater than 35 and less than 50, and the divergent lenses of the second and third components having Abbe numbers less than the Abbe numbers of their respective cemented convergent lenses but greater than 25, whereby the spherical aberration is remarkably corrected and does not exceed 0.1% of the focal length for a relative aperture of the objective having an equivalent focal length of at least 1.3.

3. A photograph objective comprising four components and having the following numerical data,

[Focal length $f=100$ mm. Relative opening $f:1.3$]

| Component | Lens No. | Radii of the lens surfaces in mm. | Thicknesses and axial separations in mm. | Index of Refraction | Abbe No. |
|---|---|---|---|---|---|
| I | 1 | $R_1=+93.32$ | $d_1=11.32$ | 1.7169 | 47.8 |
|  |  | $R_2=+358.32$ | $l_1=0.4$ |  |  |
| II | 2 | $R_3=+46.32$ | $d_2=20$ | 1.6444 | 47.9 |
|  | 3 | $R_4=\infty$ | $d_3=2$ | 1.5892 | 41 |
|  |  | $R_5=+28.68$ | $l_2=24$ |  |  |
| III | 4 | $R_6=-41.32$ | $d_4=6$ | 1.7618 | 26.5 |
|  | 5 | $R_7=+60.8$ | $d_5=22$ | 1.7449 | 44.7 |
|  |  | $R_8=-55$ | $l_3=13$ |  |  |
| IV | 6 | $R_9=+90.2$ | $d_6=16$ | 1.7169 | 47.8 |
|  |  | $R_{10}=-212.6$ |  |  |  | wherein R represents the radius of curvature of the individual lens surfaces counting from the object towards the film plane, the positive sign indicating the surface to be convex to the object and the negative sign indicating the surface to be concave thereto, $d$ represents the axial thickness of each of the various lenses and $l$ represents the axial air separation between each of the components.

References Cited in the file of this patent

UNITED STATES PATENTS

| | | |
|---|---|---|
| 583,336 | Rudolph | May 25, 1897 |
| 1,786,916 | Merte | Dec. 30, 1930 |
| 2,117,252 | Lee | May 10, 1938 |
| 2,194,413 | Warmisham et al. | Mar. 19, 1940 |
| 2,349,893 | Warmisham et al. | May 30, 1944 |
| 2,627,205 | Tronnier | Feb. 3, 1953 |